No. 667,220. Patented Feb. 5, 1901.
W. G. HUGHES.
DENTAL ENGINE.
(Application filed Mar. 7, 1900.)
(No Model.) 2 Sheets—Sheet 2.
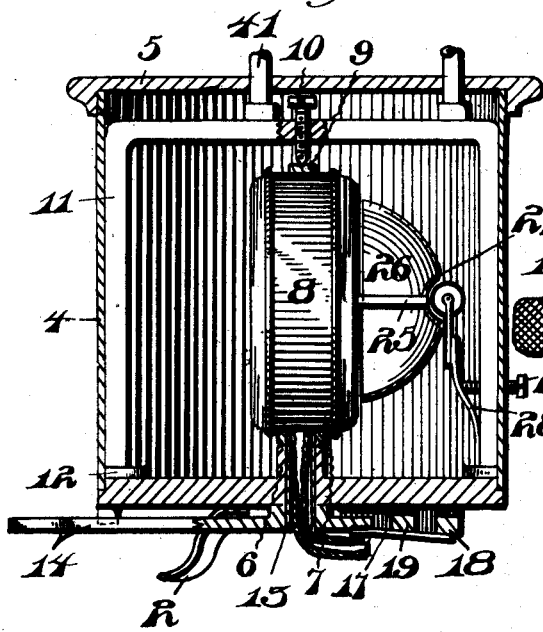
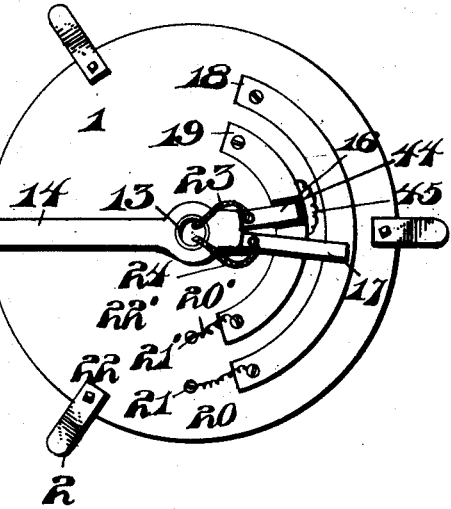
WITNESSES:
INVENTOR
W. G. Hughes.
BY
ATTORNEYS.

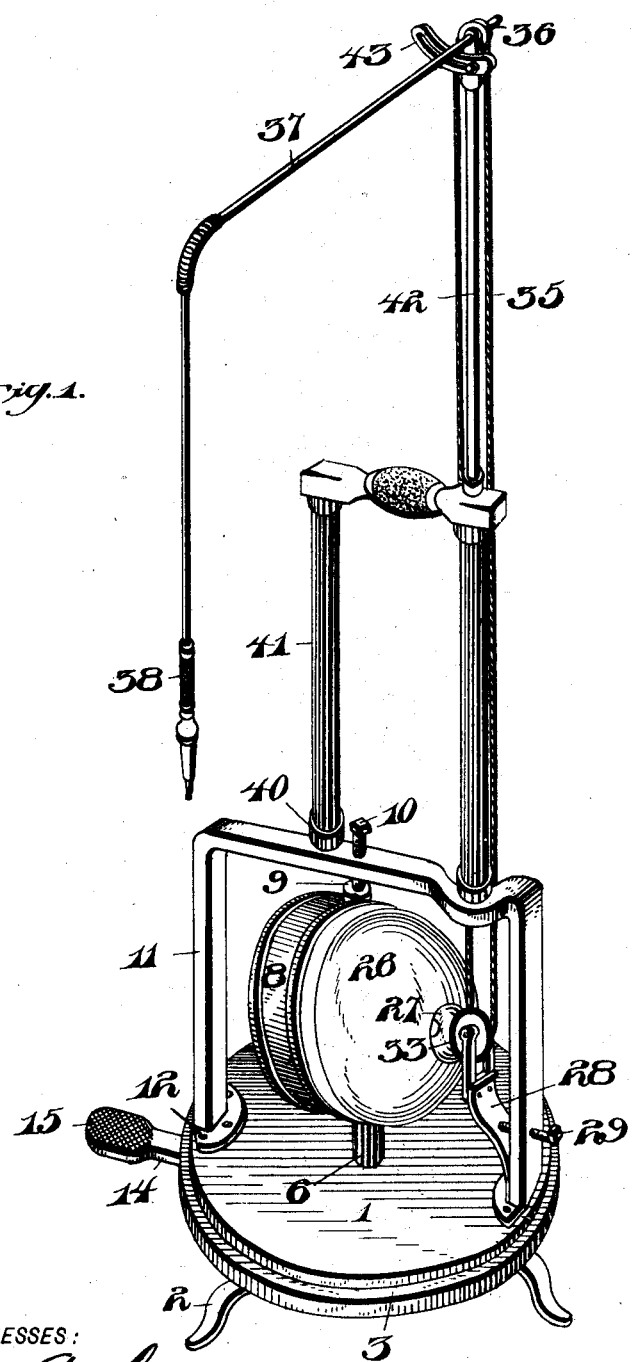

UNITED STATES PATENT OFFICE.

WILLIAM G. HUGHES, OF PITTSBURG, PENNSYLVANIA.

DENTAL ENGINE.

SPECIFICATION forming part of Letters Patent No. 667,220, dated February 5, 1901.

Application filed March 7, 1900. Serial No. 7,673. (No model.)

*To all whom it may concern:*

Be it known that I, WILLIAM G. HUGHES, a citizen of the United States of America, residing at Pittsburg, in the county of Allegheny and State of Pennsylvania, have invented certain new and useful Improvements in Dental Engines, of which the following is a specification, reference being had therein to the accompanying drawings.

This invention relates to certain new and useful improvements in induction-motors, and is particularly adapted for transmitting motion to dental engines or instruments, although the same is applicable for operating tools of various descriptions.

The invention further aims to provide means for regulating the speed of an instrument without diminishing the speed of the motor; furthermore, causing the tool to rotate in either direction without reversing the operation of the motor.

Briefly described, the invention consists in pivotally mounting upon a suitable base an electric motor of the Tesla type in communication with a source of electrical supply, the motor carrying upon its armature-shaft a semispherical cup-shaped disk operated by the motor and having centrally arranged a concave portion, the outer face of the disk being adapted to frictionally engage and operate in either direction, at a high or low rate of speed, an intermediate friction-wheel mounted and connected in such a manner as to impart motion to a tool or dental engine.

The invention further aims to construct a device of this character which will be extremely simple in construction, strong, durable, and efficient in its operation, and comparatively inexpensive to manufacture.

With the above and other objects in view the invention finally consists in the novel construction, combination, and arrangement of parts to be hereinafter more fully described, and specifically pointed out in the claims.

In describing the invention in detail reference is had to the accompanying drawings, forming a part of this specification, and wherein like numerals of reference indicate corresponding parts throughout the several views, in which—

Figure 1 is a perspective view of my improved motor with the casing removed, as shown, connected to a dental engine. Fig. 2 is a vertical sectional view thereof with the casing in position and the supporting-standards broken away. Fig. 3 is an inverted plan view of the base, showing the electrical connections and foot-lever. Fig. 4 is a cross-sectional view taken on the line 4 4 of Fig. 2. Fig. 5 is a front view of the intermediate friction-wheel and its connections. Fig. 6 is a side view of the intermediate friction-wheel. Fig. 7 is a perspective view of the tread-lever, showing the contact-springs connected thereto.

Referring to the drawings by reference-numerals, 1 indicates a suitable base provided with legs 2 for supporting the same, and an offset 3, upon which is mounted a cylindrical casing 4, having a removable cover 5. The base 1 is further provided with a centrally-arranged opening having a bearing-sleeve 6 surrounding the same at the upper end thereof, which is adapted to support an annular bearing-flange 7 of the induction-motor 8, this being preferably of the Tesla type. The upper part of the motor 8 is formed with a lug 9 to receive and support the end of a set-screw 10, which operates through a supporting-yoke 11, mounted or secured to the upper face of the base 1, as at 12. Secured to the under side of the induction-motor 8 is a downwardly-extending sleeve 13, suitably connected to a foot-lever 14, arranged beneath the base 1, as shown, and is provided at one end with a foot-tread 15 and has secured to its opposite end a pair of contact-springs 16 17, which engage contact-plates 18 19, connected to the under face of the base 1. These contact-plates are each secured to one end of the fuse-wires 20 20', while the opposite end of the wires 20 20' are connected to binding-posts 21 21', in communication by suitable wire connections 22 22' with a source of electrical supply. The reference-numerals 23 24 denote wire connections between the contact-springs 16 17 and the motor, and these wire connections extend upwardly through the sleeve 13, as will be seen in Fig. 2.

The armature-shaft 25 of the motor extends outwardly on one side thereof and has suitably connected to the end thereof a semispherical cup-shaped friction-disk 26, which surrounds the outwardly-extending portion of the shaft and is provided centrally on its connection with the shaft with a concave portion 27, and the disk is adapted to be rotated by the motor 8. Secured to the inner face of one side of the yoke 11 is a bearing-spring 28, adjusted by means of a set-screw 29, operating through the casing and side of the yoke. The upper end of the spring 28 has suitably connected thereto an upwardly-extending bracket 30, provided at its upper end with bearings 31, in which is rotatably mounted an operating-shaft 32, carrying a fixed intermediate friction-wheel 33 and a fixed pulley-wheel 34. The pulley-wheel 34 is connected by a belt or cord 35 to a pulley 36, mounted on one end of the flexible shaft 38. The top of the yoke 11 is bowed to permit of the operation of the cord or belt 35 and is further provided with a pair of collars 40, in which is secured an auxiliary supporting-yoke 41, extending upwardly through the casing 5 and carrying a standard 42, provided with an adjustable bracket 43 for supporting the flexible shaft 37, as shown.

The contact-springs 16 17 are suitably insulated from the foot-lever 14 and the contact-plates 18 19 suitably insulated from the base 1. The plate 19 is provided with a suitable circuit-breaker 44, which retains the spring 16 for breaking the circuit, as shown in Fig. 3. This circuit-breaker is formed by cutting away a portion of the plate 19 and providing said cut-away portion with a suitable insulation. By mounting the induction-motor in the manner shown—that is to say, the set-screw 10 having its end engage the lug 9 and the annular flange 7 mounted upon the bearing-sleeve 6, and, further, connecting the motor to the lever 14 by means of the sleeve 13—it will permit of a rotary movement of the motor on its axis, as will be seen in dotted lines of Fig. 4. Owing to securing the semispherical cup-shaped disk to the armature-shaft the disk will move simultaneously with the motor in the same direction, as will also be seen in dotted lines of Fig. 4.

It will be evident that the speed of the motor and the friction-wheel can be regulated by its engagement with the outer face of the disk—that is to say, as the wheel engages the disk near the center thereof the revolution of the same will be at a slower rate of speed than when the wheel engages the disk near the outer edge thereof. It will be further apparent that by swinging the motor and disk either right or left, or vice versa, the wheel 33 will be caused to rotate in an opposite direction, or, in other words, the movement of the wheel will be reversed. During the operation of increasing or diminishing the speed of the wheel 33 or reversing its movement the motor 8 and disk are operating at full speed, or, in other words, the speed of the motor and disk remains the same during the movement imparted to the wheel 33.

The operation of my improved device is as follows: Assuming that the device is in position as shown in Fig. 1 of the drawings—that is to say, the lever arranged centrally of the base and the spring 16 seated within the circuit-breaker—the lever is then swung to one side, as shown in dotted lines of Fig. 4, forming thereby a circuit operating the armature-shaft and motor, revolving the disk, which frictionally engages the wheel 33, imparting motion thereto, as well as to shaft 32, pulley-wheel 34, and transmits motion, by means of the belt or cord 35, to the flexible shaft 37, rotating the engine or other tool 38. The foot-lever 14 not only makes and breaks the electric circuit, but also operates to rotate the motor on its axis and tends to bring the frictional disks into an operative combination or to bring the disk into central inoperative relation when the circuit is broken. The concave portion of the disk is formed to permit of the discontinuing of the operation of the intermediate friction-wheel, as the same when seated within this concave portion does not engage the outer face of the disk, and therefore will not be operated. Furthermore, the wheel being in this position the spring 16 is seated within the circuit-breaker and the motor and disk remain in an inoperative position.

It is thought that the many advantages of my improved motor can be readily understood from the foregoing description, taken in connection with the accompanying drawings, and it will be noted that various changes may be made in the details of construction without departing from the general spirit of my invention.

Having thus fully described my invention, what I claim as new, and desire to secure by Letters Patent, is—

1. The combination with a base carrying an electric motor in communication with a source of electrical supply, of a disk suitably connected to said motor, a foot-lever adapted when operated to impart a rotary movement to said motor and disk and forming an electrical circuit for operating said motor and disk, a friction-wheel adapted to be engaged and operated by said disk, and connection between said wheel and dental engine or other tool for operating the same.

2. The combination with a base carrying an electric motor, of a pair of contact-plates suitably connected to said base and in communication with a source of electrical supply, a disk suitably connected to said motor, a foot-lever connected to said contact-plates and adapted when operated to impart a rotary movement to said motor and disk, and to form an electrical circuit causing thereby the operation of said motor and disk, and means adapted to be engaged and operated by said disk for imparting motion to a dental engine or other tool.

3. The combination with a suitable base having an electric motor suitably mounted thereon and in communication with a source of electrical supply, of a disk suitably connected to said motor, a foot-lever connected to said motor for imparting a rotary movement thereto as well as to said disk, means connected to said lever for forming an electrical circuit causing thereby the operation of said motor and disk and adapted to be operated thereby, an intermediate friction-wheel adapted to be engaged and operated by said disk, and means connected to said wheel and operated thereby for imparting motion to a dental engine or other tool.

4. The combination with a suitable base having an electric motor mounted thereon and in communication with a source of supply, of a cup-shaped disk suitably connected to said motor and adapted to be operated thereby, an operating-lever connected to said motor for imparting a rotary movement thereto as well as to said disk, means connected to said lever for forming an electrical circuit causing thereby the operation of said motor and disk, an intermediate friction-wheel suitably connected to said base and adapted to be engaged and operated by said disk in opposite directions, and means connected to said wheel and operated thereby for imparting motion to a dental engine or other tool.

5. The combination with a suitable base having an electric motor mounted thereon and in communication with a source of supply, of a semispherical cup-shaped disk suitably connected to said motor and adapted to be operated thereby, an operating-lever connected to said motor for imparting a rotary movement thereto as well as to said disk, means connected to said lever for forming an electrical circuit causing thereby the operation of said motor and disk, an intermediate frictional wheel suitably connected to said base and adapted to be engaged and operated by said disk in opposite directions, and means connected to said wheel and operated thereby for imparting motion to a dental engine or other tool.

6. The combination with a suitable base having an electric motor suitably mounted thereon and in communication with a source of electrical supply, of a disk suitably connected to said motor and adapted to be operated thereby, means connected to said motor for imparting a rotary movement thereto and to said disk, an intermediate friction-wheel adapted to be engaged and operated by said disk, and means connected to said wheel and operated thereby for imparting motion to a dental engine or other tool.

7. The combination with a suitable base having an electric motor suitably mounted thereon and in communication with a source of electrical supply, of a cup-shaped disk suitably connected to said motor and adapted to be operated thereby, means connected to said motor for imparting a rotary movement thereto and to said disk, an intermediate friction-wheel adapted to be engaged and operated by said disk, and means connected to said wheel and operated thereby for imparting motion to a dental engine or other tool.

8. The combination with a suitable base having an electric motor suitably mounted thereon and in communication with a source of electrical supply, of a semispherical cup-shaped disk suitably connected to said motor and adapted to be operated thereby, means connected to said motor for imparting a rotary movement thereto and to said disk, an intermediate friction-wheel adapted to be engaged and operated by said disk, and means connected to said wheel and operated thereby for imparting motion to a dental engine or other tool.

9. The combination with an electric motor, of a semispherical cup-shaped disk suitably connected thereto and operated thereby, a foot-lever connected to said motor for imparting a rotary movement thereto and to said disk, means connected to said lever for making and breaking an electrical circuit causing thereby the operation and discontinuing the operation of the said motor and disk, and means arranged in suitable relation to said disk and adapted to be operated thereby for imparting motion to a dental engine or other tool.

10. The combination with a base carrying an electric motor in communication with a source of electrical supply, of a disk suitably connected to said motor and adapted to operate simultaneously therewith in the same direction, a lever suitably connected to said motor for imparting a rotary movement thereto as well as making and breaking an electrical circuit, and means suitably mounted upon said base and adapted to be operated by said disk for imparting motion to a dental engine or other tool.

11. The combination with a base carrying an electric motor in communication with a source of electrical supply, of a disk suitably connected to said motor and adapted to operate simultaneously therewith in the same direction, a lever suitably connected to said motor for imparting a rotary movement thereto as well as to make and break an electrical circuit, an intermediate friction-wheel suitably mounted upon said base and adapted to be engaged by said disk for operating the same, and connections between said wheel and a dental engine or other tool for operating the same when the said wheel is operated.

12. In an induction-motor, the combination with a base carrying an electric motor in communication with a source of electrical supply, of a disk suitably connected to said motor and adapted to be operated thereby, means connected to said base for making and breaking an electrical circuit and simultaneously with the breaking and making of the circuit imparting a rotary movement to said motor and disk, and means connected to said motor for discontinuing the operation thereof.

13. In a device of the character described, the combination with a base having an electric motor suitably mounted thereon, of a pair of contact-plates connected to said base and in communication with a source of electrical supply, a lever for imparting a rotary movement to said motor and provided with a pair of contact-springs for engaging said plates thereby making and breaking an electrical circuit for operating and for discontinuing the operation of said motor, and a semispherical cup-shaped disk suitably connected to said motor and adapted to be operated simultaneously therewith when the said circuit is formed.

In testimony whereof I affix my signature in the presence of two witnesses.

WILLIAM G. HUGHES.

Witnesses:
 JOHN NOLAND,
 WILLIAM E. MINOR.